United States Patent [19]
Gates

[11] Patent Number: 5,261,805
[45] Date of Patent: Nov. 16, 1993

[54] DIE FOR EXTRUSION OF BLOWN PLASTIC FILM

[75] Inventor: Peter C. Gates, Georgetown, Canada

[73] Assignee: Polysystem Machinery Manufacturing Inc., Mississauga, Canada

[21] Appl. No.: 155,978

[22] Filed: Feb. 16, 1988
(Under 37 CFR 1.47)

[51] Int. Cl.⁵ .................. B29C 47/20; B29D 23/22
[52] U.S. Cl. .......................... 425/72.1; 425/380; 425/462; 425/467
[58] Field of Search ............... 425/72.1, 133.1, 461, 425/467, 131.1, 462, 380

[56] References Cited

U.S. PATENT DOCUMENTS

| | | | |
|---|---|---|---|
| 3,034,526 | 5/1962 | Roselle | 137/1 |
| 3,966,377 | 6/1976 | Upmeier et al. | 425/72.1 |
| 4,019,843 | 4/1977 | Zimmermann | 425/72.1 |
| 4,063,865 | 12/1977 | Becker | 425/467 |
| 4,182,603 | 1/1980 | Knittel | 425/462 X |
| 4,201,532 | 5/1980 | Cole | 425/467 X |
| 4,298,325 | 11/1981 | Cole | 425/133.1 X |
| 4,565,515 | 1/1986 | Maier | 425/462 X |
| 4,687,430 | 8/1987 | Morris et al. | 425/133.1 |

FOREIGN PATENT DOCUMENTS

| | | |
|---|---|---|
| 1953114 | 5/1971 | Fed. Rep. of Germany . |
| 1957985 | 5/1971 | Fed. Rep. of Germany . |
| 1964675 | 7/1971 | Fed. Rep. of Germany . |
| 2508930 | 12/1978 | Fed. Rep. of Germany . |
| 676054 | 4/1980 | U.S.S.R. . |
| 1573940 | 8/1980 | United Kingdom . |

Primary Examiner—Richard L. Chiesa
Attorney, Agent, or Firm—Anthony Asquith & Co.

[57] ABSTRACT

The invention relates to the kind of die which has many helical grooves (40) spiralling around a mandrel, and to a new way of feeding the liquid resin from the main supply duct (48) to the grooves. Instead of the usual one groove to one conduit relationship, in the invention the channels (41) to the grooves are intercalated with the conduits (47). Each groove is fed via feed-channels (45,46) from two of the conduits, and each conduit feeds two of the grooves. The result is that the cooler liquid resin from the walls of the main duct is constrained to move to the centre of the stream in the groove. The arrangement leads to an improvement In the homogeneity of the resulting film.

8 Claims, 4 Drawing Sheets

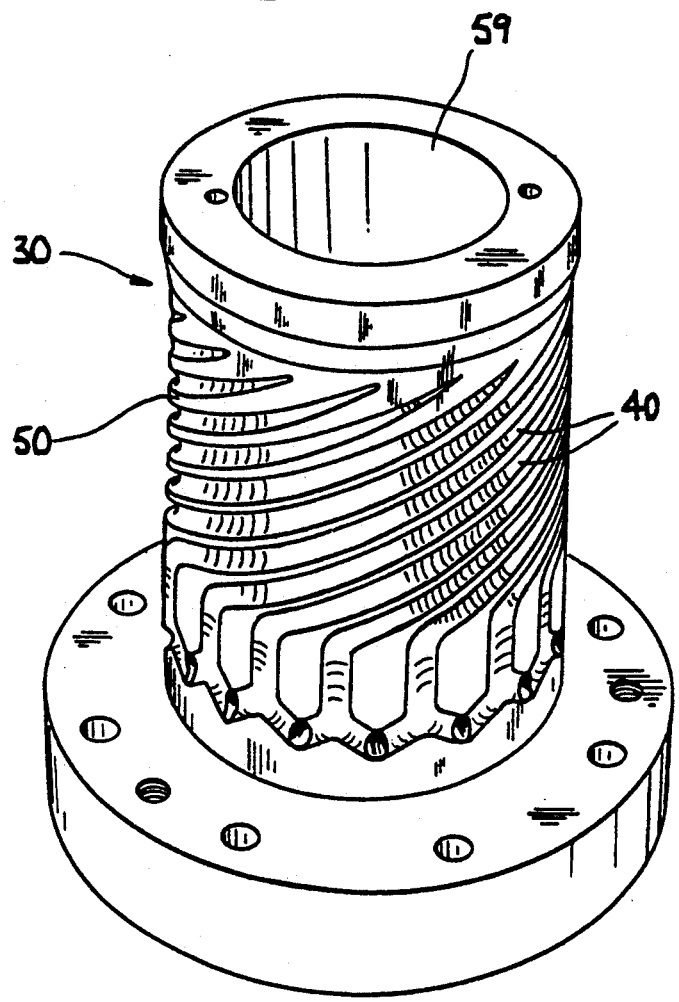

DIE FOR EXTRUSION OF BLOWN PLASTIC FILM

This invention relates to the manufacture of plastic film.

BACKGROUND OF THE INVENTION

Cole, U.S. Pat. Nos. 4,201,532, May 6, 1980, and 4,298,325 Nov. 3, 1982 illustrate the conventional spiral-mandrel extrusion dies used for manufacturing blown plastic film. In this kind of die, a basically cylindrical mandrel is formed with many individual helical grooves, which spiral around the circumference of the mandrel.

Liquid resin is fed to the start-channel of each groove through a respective conduit, which receives the liquid resin from a main supply duct. The main supply duct is common to all the conduits.

The invention is concerned with the manner in which the liquid resin travels from the main supply duct to the start-channels of the helical grooves.

THE PRIOR ART

In the extrusion dies shown In the above prior patent publications, a problem arises, which will now be described with reference to FIG. 1 of U.S. Pat. No. 4,201,532, referred to above.

Molten polymer, or liquid resin in more general terms, enters the die through the main supply duct 24. As a general rule a liquid flowing in a duct has a velocity profile over the cross-section of the duct such that the liquid at the centre of the duct flows more quickly than the liquid on the walls of the duct. It is recognised in the invention that one result of this velocity profile is that the liquid at the centre of the duct is not only moving faster but is also hotter than the liquid in contact with the walls of the duct.

The cooler the liquid resin, the heavier its viscosity, so that the liquid at and near the walls of the duct 24 tends to travel somewhat sluggishly along the duct as compared with the hotter liquid in the centre of the duct. The material travelling very slowly along the walls can start to degrade and to affect the properties of the blown plastic film, particularly the homogeneity of the film.

The effect, if not checked, would tend to snowball, and therefore in dies of this kind the walls of the main duct must be kept well-heated, to make sure the temperature differences and gradients In the liquid resin are kept small. Even so, a significant temperature difference over the cross-section of the duct 24 is, in practice, unavoidable.

The individual conduits 30 branch out from the main duct 24, and attention is now directed to the disposition of the liquid that flows in the conduits 30. It may be noted that the liquid that enters the bottom sector of the conduit tends to be liquid that has travelled along the walls of the main duct 24, whereas the liquid that enters the top sector of the conduit tends to be liquid more from the centre of the main duct 24.

In each of the conduits 30, therefore, the liquid resin at the top of the conduit is hotter than the liquid resin at the bottom of the conduit. This temperature difference again tends not to be self-correcting, since the hotter liquid, being less viscous, passes quickly through the die, leaving the cooler liquid behind.

It has been found to be generally the case that a significant temperature difference is still present as the liquid resin leaves the conduits 30 and enters the spiral grooves.

This temperature difference—between the top sector and the bottom sector of the conduit—leads to a significant non-homogeneity In the plastic film produced by the die.

SUMMARY OF THE INVENTION

In the invention, the start-channel of the helical groove is fed not from a single conduit but from two feed-channels interposed between the conduits and the start-channels. In the invention, the two streams of liquid resin from the two feed-channels are arranged to converge before entering the start-channel. In the invention, the conduits and the start-channel are so arranged that the respective cool sectors at the bottoms of the two conduits are brought together before the streams enter the start-channel.

In this way, the distribution of liquid over the start-channel is such that the cooler liquid is surrounded by hot liquid. The result is that in the invention the liquid resin passing up through the grooves is subject to more gentle temperature gradients than has been the case when the start-channels are fed in the conventional way, i.e. when each start-channel is fed directly from only one respective conduit. In the invention, the homogeneity of the resulting plastic film is much improved.

It is recognised in the Invention that the evenness of the properties of the resulting film is such that blown film can be manufactured economically even In such difficult-to-blow materials as high-density polyethylene.

BRIEF DESCRIPTION OF THE DRAWINGS

Embodiments of the invention are shown in the accompanying drawings, in which:

FIG. 1 is a pictorial view of a mandrel of an extrusion die;

DESCRIPTION OF THE PREFERRED EMBODIMENTS

Figure 4:
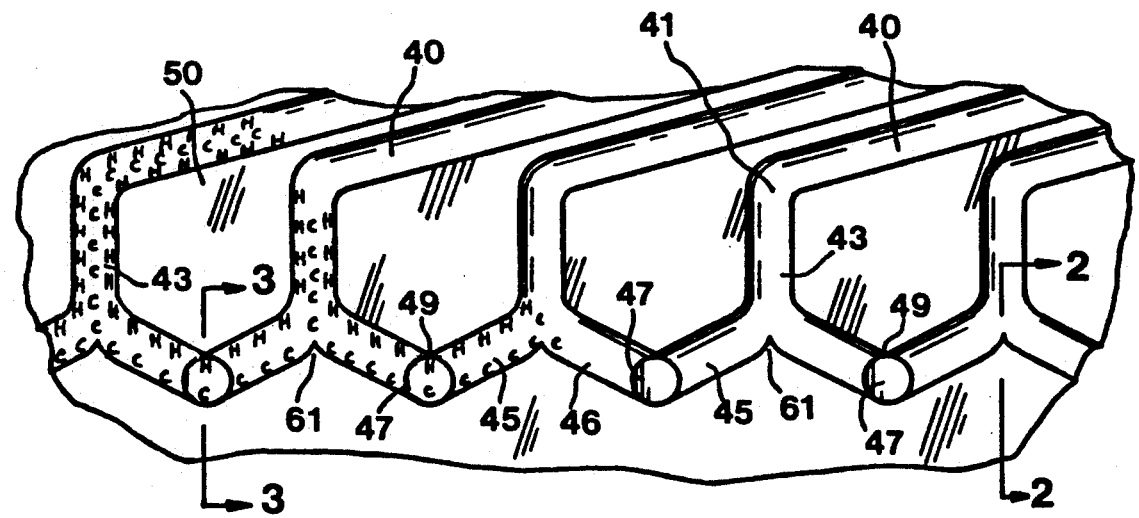
FIG. 4 is a side elevation of part of the mandrel of FIG. 1.
Figure 2:
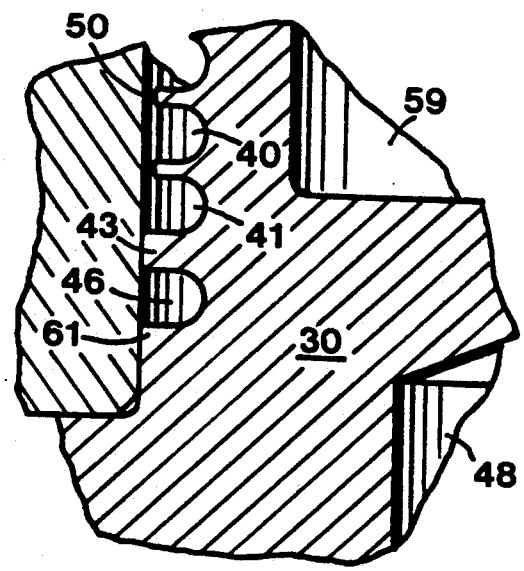
FIGS. 2 and 3 are cross-sections of part of the mandrel and associated components of the extrusion die, drawn on lines 2—2 and 3—3 of FIG. 1.

The mandrel 30 shown in FIGS. 1 to 4 is provided with many helical grooves 40 which spiral around the outer cylindrical surface 50 of the mandrel. Liquid resin emerges from these grooves into the annular chamber 52 formed between the surface 50 and the inner surface 54 of the outer die member 56.

The top of the annular chamber 52 narrows to form an annular nozzle 58, through which the liquid resin is extruded. The plastic resin emerges from the annular nozzle 58 in the form of a tube, and the tube Is inflated by means of air blown into the hollow interior 59 of the mandrel 30.

Each one of the helical grooves 40 is provided with a start-channel 41, and the resin enters the start-channel 41 via a lead-in-channel 43. The resin enters the lead-in-channel 43 from both a left feed-channel 45 and a right feed-channel 46 simultaneously in accordance with the invention.

The feed-channels 45,46 are fed via conduits 47 from the main resin-supply-duct 48. The conduits are intercalated with the start channels around the circumference of the mandrel, and are interconnected, as shown, by the feed-channels.

Figure 3:
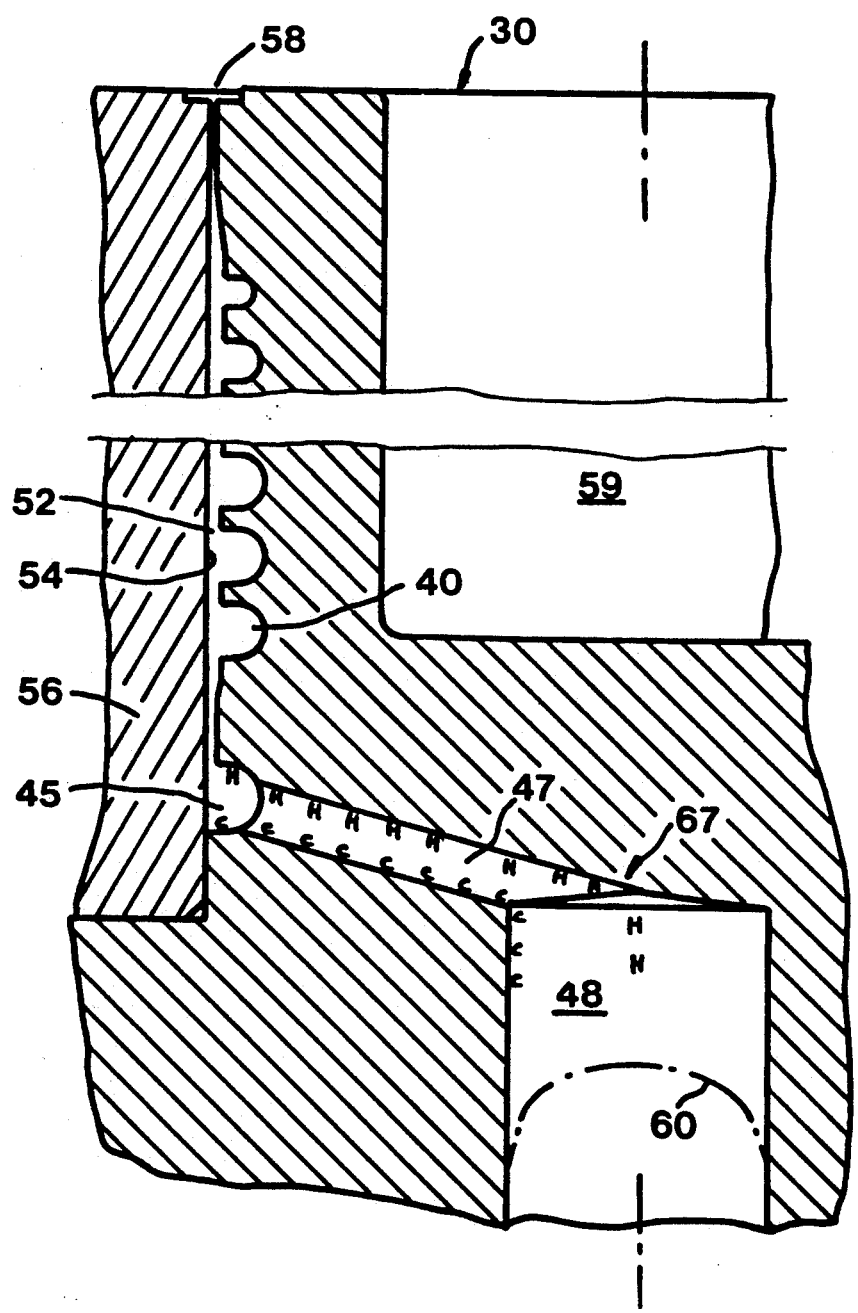

The line 60 in FIG. 3 is a graph of the temperature distribution of the liquid resin flowing upwards in the main duct 48. Reference is made to the "hot" liquid and the "cool" liquid for the sake of convenience—in fact of course the transition between the different temperatures is gradual and not stepped.

The hot liquid from the centre of the main duct 48 enters the top sector of the conduit 47, and the cool liquid from the walls of the main duct 48 occupies the bottom sector of the conduit 47. The letters H and C on the Figures denote the sectors and zones occupied by the appropriate temperature liquids.

The stream of liquid flowing along the conduit 47 splits into two sub-streams upon reaching the flow-dividing-means 49. The sub-streams divide and separate, one to each of the feed-channels 45,46.

From FIG. 4 in particular it can be seen that the respective cool sectors from the two sub-streams in the two feed-channels 45,46 meet and converge at the spit 61 between the two feed-channels. The resin flowing upwards in the lead-in-channel 43 therefore has cool liquid towards the centre and hot liquid towards the outside. This temperature distribution extends into the groove 40 itself.

The result is that the liquid in the groove is much more even as to its temperature than has been the case in conventional designs of extrusion die.

In some previous dies, it has been possible for the cool liquid to travel only very slowly through the die, due to the internal shape and structure of the die. This cool liquid might remain in the die for several minutes, as compared with the normal residence time of a few seconds that the liquid spends in the die.

If it were permitted to have a long residence period, the liquid might start to cure to some extent, and to change its properties, so that when it finally did emerge from the nozzle, there is a flaw, or at least a non-homogeneity, in the manufactured plastic film.

In the invention, because there is less variation in temperature, there also is less variation in the velocity of the liquid, a feature which leads to the film being highly homogeneous.

In the invention, the cold material does not tend to remain upon the inside surfaces of the die, but instead the colder material is gathered up and carried along with the flow of liquid. All the portions of the liquid therefore tend to be at a more uniform temperature, and to have a more uniform residence time within the die.

In the invention, it is recognised that precautions should be taken to ensure that there are no pockets in which the liquid might collect, and start to cure. Thus, the conduits 47 should communicate with the duct 48 in a way that does not lead to the formation of pockets. For example, the holes that comprise the conduits 47 are so formed as to have the relationship as illustrated at 67 in FIG. 3 with the main-duct 48.

Figure 5:
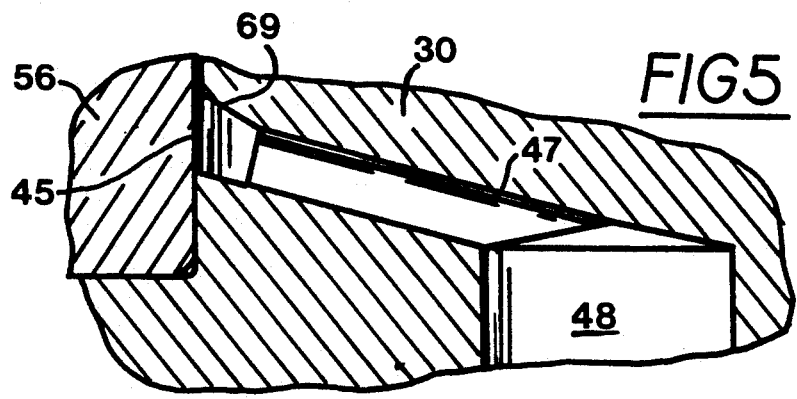
FIG. 5 is a cross-section, corresponding to FIG. 2, of another mandrel.

For the same reason, the feed-channels 45,46 may be formed with sloping upper and lower surfaces, as shown at 69 in FIG. 5, to make the flow of resin into the lead-in-channel 43 as smooth and unobstructed as possible.

In the die of FIGS. 1 to 4, there are as many conduits 47 as grooves 40, and twice as many feed-channels 45,46. Each groove is fed from two conduits 47, and each conduit feeds two grooves.

Figure 6:
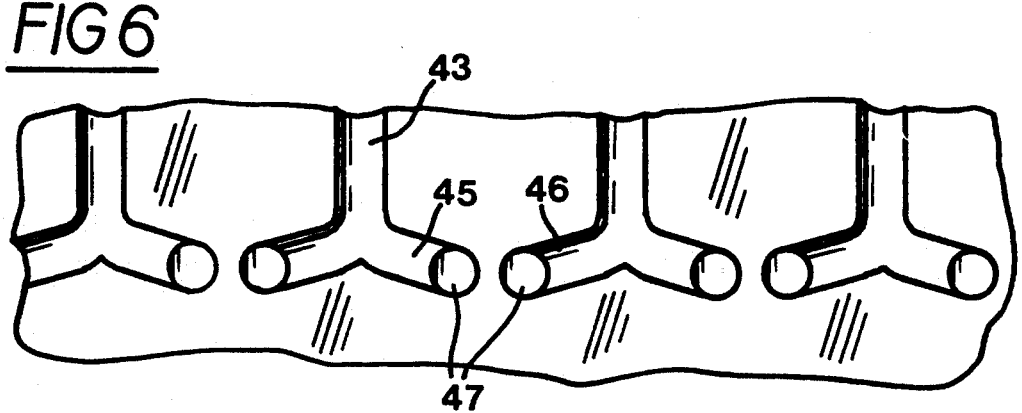
FIGS. 6 and 7 are elevations, corresponding to FIG. 4, of further mandrels.

In the embodiment shown in FIG. 6, there are twice as many conduits as grooves. This is not generally preferred, however—the designer of the die is usually concerned to provide as many grooves as possible (to ensure that the manufactured plastic film consists of many "layers" or plies) and if there were to be double that quantity of conduit holes into the main duct, the die would have the aspect of being riddled with holes.

Figure 7:
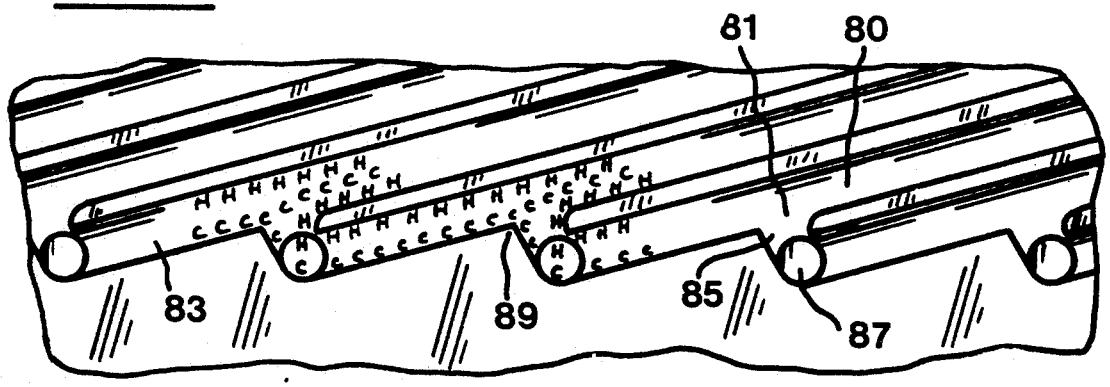

It is not essential, in the invention, that the start-channel (including the lead-in-channel) and the feed-channels, should be as clearly-defined and separate from each other as they are in the FIGS. 1 to 4 embodiment. In the embodiment shown in FIG. 7, for instance, the start-channel of the helical groove is identified by the reference numeral 80, the lead-in-channel by 81, the left feed-channel by 83, the right feed-channel by 85, the conduit by 87, and the spit, where the cool sectors of the liquid converge, by 89.

In the invention it is essential that the respective streams from the two feed-channels converge before entering the groove, but it is not essential that the spit that defines the point of convergence should be geometrically at the centre of the lead-in-channel.

I claim:

1. Extrusion die for the manufacture of blown plastic film, wherein:

the die includes an annular nozzle (58) through which liquid resin is extruded, and an annular chamber (52) from which the liquid resin enters the nozzle;

the annular chamber is provided with a plurality of grooves (40) which encircle the annular chamber in respective helical spirals;

in respect of each one of the grooves, the groove has a respective length as measured in the direction of the said helical spiral, and the die includes means for keeping each one of the grooves separate from, and isolated from liquid-stream-conveying communication with, the other grooves along the whole of the said length;

the die includes a main-supply-duct (48) through which liquid resin enters the die;

the die includes a plurality of conduits (47) in liquid-stream-conveying communication with the main-supply-duct;

the die includes feed-channels (45,46;83,85) and start-channels (41;80);

the arrangement of the die is such that each start-channel is in liquid-stream-conveying communication with a respective one, and only one, of the grooves, and each feed-channel is in liquid-stream-conveying communication with at least one of the conduits;

the arrangement of the die is such that a first or hot sector of the stream of liquid resin entering one of the conduits mainly comprises liquid from a hot zone of the main supply-duct, the hot zone being a zone where the liquid is predominantly relatively hot, and a second or cool sector of the stream of liquid resin entering that same conduit mainly comprises liquid from a cool zone of the main supply duct, the cool zone being a zone where the liquid is predominantly relatively cool;

the arrangement of the conduit is such that the said hot and cool sectors of the stream remain separate and distinct in the stream of liquid passing through the conduit, and the said hot and cool sectors of the stream remain separate and distinct as the stream passes from the conduit into the respective feed-channel;

the arrangement of the feed-channel is such that the two sectors occupy different sectors of the cross-section of the feed-channel;

each start-channel is in liquid-stream conveying communication with a pair of the feed-channels;

a respective junction is defined between each start-channel and its respective pair of feed-channels;

the arrangement of the die is such that, at the junction, the two streams from the feed-channels converge into a combined stream in the start-channel;

and the arrangement of the die is such that the two hot-sectors of the respective streams of liquid from the two feed-channels at the junction lie spaced apart, towards opposite sides of the cross-section of the start-channel, and the cool-sectors of the said streams occupy a central portion of the start-channel, between the two hot-sectors.

2. Die of claim 1, wherein the junction is symmetrical about the start-channel (41).

3. Die of claim 1, wherein the start-channel of the groove includes a lead-in channel (43;81) which lies at a substantial angle to the line of the groove (40).

4. Die of claim 1, wherein the arrangement of the die is such that the two cool sectors of the respective streams of liquid from the two feed-channels become contiguous upon entering the start channel.

5. Die of claim 4, wherein the junction is so shaped as to include a spit (61;89) between the two feed-channels;

and the arrangement of the die is such that the said cool sector of the stream from each feed-channel is the sector of the stream that lies closest to the spit.

6. Die of claim 5, wherein the spit is so shaped that the liquid passes the spit in a smooth and unobstructed manner.

7. Die of claim 4 wherein:

each of the conduits (47) is in liquid-stream-conveying communication with a respective pair (45,46) of the feed-channels;

the die includes a flow-divider means for dividing and separating the flow from the conduit into sub-streams;

the said means is effective to communicate the said two separate sub-streams one into each of the two feed-channels comprising the said pair;

and the arrangement of the die is such that each of the sub-streams retains, in the respective feed-channel, a respective hot sector and a cool sector.

8. Die of claim 7, wherein:

the die includes the same number of conduits (47;87) as start-channels (41,80);

the start-channels are intercalated circumferentially with the conduits, around the annular chamber;

the die includes twice as many feed-channels (45,46) as conduits;

the feed-channels are so arranged as to:

(a) communicate each start-channel to the two nearest conduits, one to either side of that start-channel; and (b) communicate each conduit to the nearest start-channels, one to either side of that conduit.

* * * * *